(12) United States Patent
Lee et al.

(10) Patent No.: US 11,317,401 B2
(45) Date of Patent: Apr. 26, 2022

(54) METHOD AND APPARATUS FOR SELECTING CARRIER

(71) Applicant: LG Electronics Inc., Seoul (KR)

(72) Inventors: Youngdae Lee, Seoul (KR); Jaewook Lee, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 69 days.

(21) Appl. No.: 16/616,855

(22) PCT Filed: Jul. 24, 2018

(86) PCT No.: PCT/KR2018/008348
§ 371 (c)(1),
(2) Date: Nov. 25, 2019

(87) PCT Pub. No.: WO2019/022468
PCT Pub. Date: Jan. 31, 2019

(65) Prior Publication Data
US 2021/0176740 A1 Jun. 10, 2021

Related U.S. Application Data

(60) Provisional application No. 62/536,978, filed on Jul. 25, 2017, provisional application No. 62/536,976, filed on Jul. 25, 2017.

(51) Int. Cl.
*H04W 72/04* (2009.01)
*H04W 72/10* (2009.01)
(Continued)

(52) U.S. Cl.
CPC ......... *H04W 72/044* (2013.01); *H04W 72/10* (2013.01); *H04W 72/14* (2013.01); *H04W 80/02* (2013.01)

(58) Field of Classification Search
CPC ... H04W 72/044; H04W 72/10; H04W 72/14; H04W 80/02; H04W 72/02
See application file for complete search history.

(56) References Cited

U.S. PATENT DOCUMENTS

2011/0170495 A1*  7/2011  Earnshaw ............... H04L 5/001
                                                      370/329
2017/0048903 A1*  2/2017  Yi ........................... H04W 4/70
(Continued)

FOREIGN PATENT DOCUMENTS

EP              02244515         10/2010

OTHER PUBLICATIONS

Huawei, HiSilicon, "UE handling on multiple grants," R2-1706903, 3GPP TSG-RAN WG2 AdHoc, Qingdao, China, dated Jun. 27-29, 2017, 4 pages.

*Primary Examiner* — Srilakshmi K Kumar
*Assistant Examiner* — Hung K Du
(74) *Attorney, Agent, or Firm* — Fish & Richardson P.C.

(57) ABSTRACT

Provided are a method for a user equipment (UE) to transmit a medium access control protocol data unit (MAC PDU) in a wireless communication system, and an apparatus supporting the same. The method may include: allocating resource grants on multiple carriers; selecting a first carrier among the multiple carriers, based on allocated time of the resource grants; allocating a resource of the selected first carrier to a logical channel with the highest priority; and transmitting the MAC PDU, by using the resource of the selected first carrier.

15 Claims, 12 Drawing Sheets

(51) Int. Cl.
*H04W 72/14* (2009.01)
*H04W 72/02* (2009.01)
*H04W 80/02* (2009.01)

(56) References Cited

U.S. PATENT DOCUMENTS

2017/0127405 A1* 5/2017 Agiwal ............. H04W 72/0413
2018/0279259 A1* 9/2018 Gulati ................ H04W 28/021

* cited by examiner

METHOD AND APPARATUS FOR SELECTING CARRIER

CROSS-REFERENCE TO RELATED APPLICATIONS

This application is a National Stage application under 35 U.S.C. § 371 of International Application No. PCT/KR2018/008348, filed on Jul. 24, 2018, which claims the benefit of U.S. Provisional Application Nos. 62/536,976 filed on Jul. 25, 2017, and 62/536,978 filed on Jul. 25, 2017. The disclosures of the prior applications are incorporated by reference in their entirety.

BACKGROUND OF THE DISCLOSURE

Field of the Disclosure

The present invention relates to a wireless communication system, and more particularly, to a method for a user equipment (UE) to select at least one carrier among multiple carriers based on resource grants and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

SUMMARY OF THE DISCLOSURE

Meanwhile, according to the prior art, a resource pool is configured only on a single carrier. Thus, an RRC layer of the UE (i.e. UE RRC) selects a resource pool on a single carrier, and then a MAC layer of the UE (i.e. UE MAC) performs resource (re-)selection on the selected resource pool. On the other hand, in case that resource pools are configured on multiple carriers, the UE may perform parallel transmissions on different carriers. If the UE performs parallel transmissions on different carriers, the UE will independently select resources on each pool/carrier. In this case, the UE may perform parallel transmissions on congested carriers, and so increase congestion on those carriers. Thus, a method for a UE to select at least one carrier among multiple carriers and an apparatus supporting the same need to be proposed.

One embodiment provides a method for transmitting, by a user equipment (UE), a medium access control protocol data unit (MAC PDU) in a wireless communication system. The method may include: allocating resource grants on multiple carriers; selecting a first carrier among the multiple carriers, based on allocated time of the resource grants; allocating a resource of the selected first carrier to a logical channel with the highest priority; and transmitting the MAC PDU, by using the resource of the selected first carrier.

Another embodiment provides a user equipment (UE) transmitting a medium access control protocol data unit (MAC PDU) in a wireless communication. The UE may include: a memory; a transceiver; and a processor, connected to the memory and the transceiver, that: allocates resource grants on multiple carriers; selects a first carrier among the multiple carriers, based on allocated time of the resource grants; allocates a resource of the selected first carrier to a logical channel with the highest priority; and controls the transceiver to transmit the MAC PDU, by using the resource of the selected first carrier.

The UE can select at least one carrier among configured multiple carrier.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G communication system is an evolution of the LTE-A.

For clarity, the following description will focus on LTE-A. However, technical features of the present invention are not limited thereto.

Figure 1:
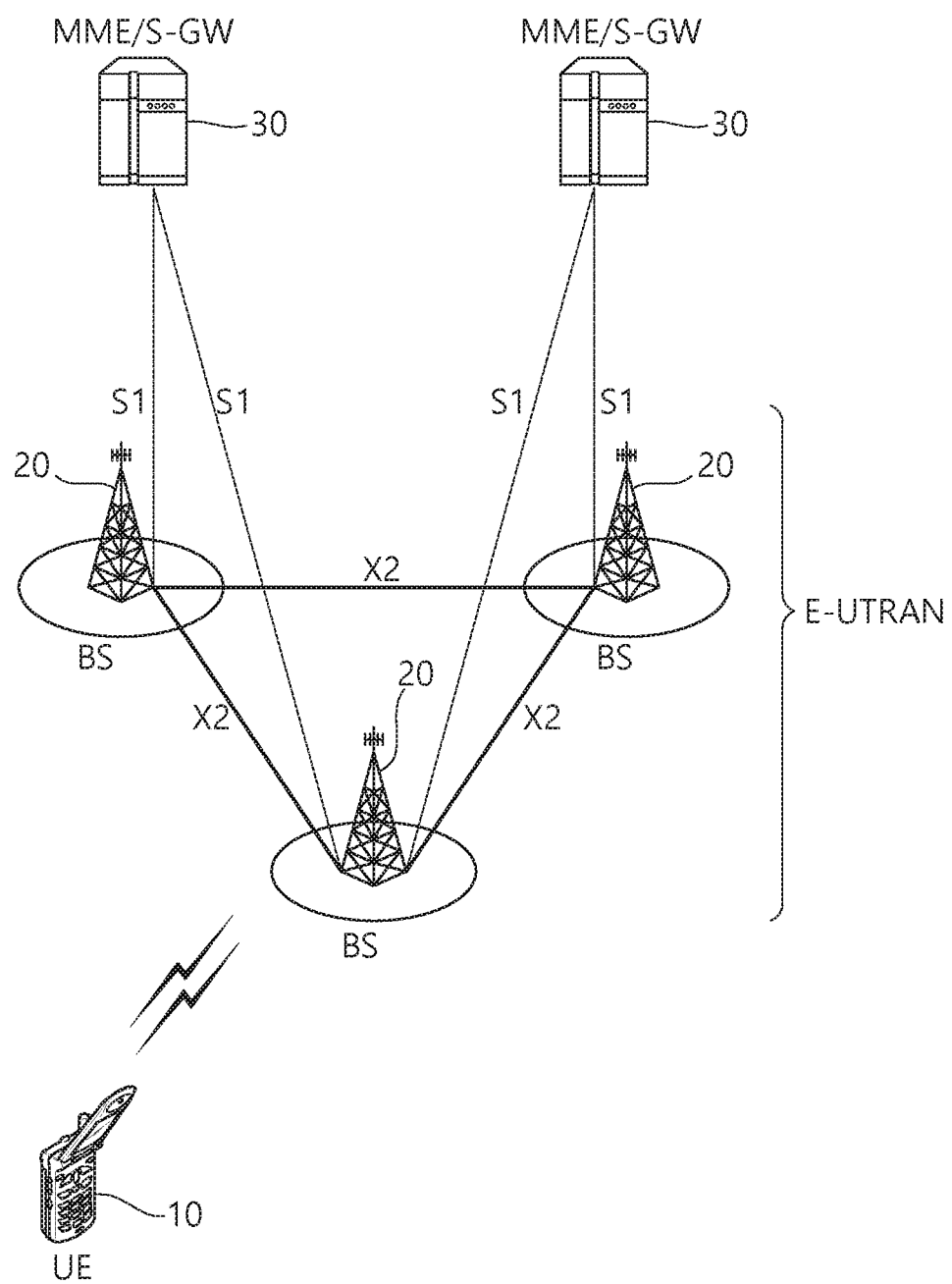
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE IDLE state management, ciphering of the user plane, SAE bearer control, and ciphering and integrity protection of NAS signaling.

Figure 2:
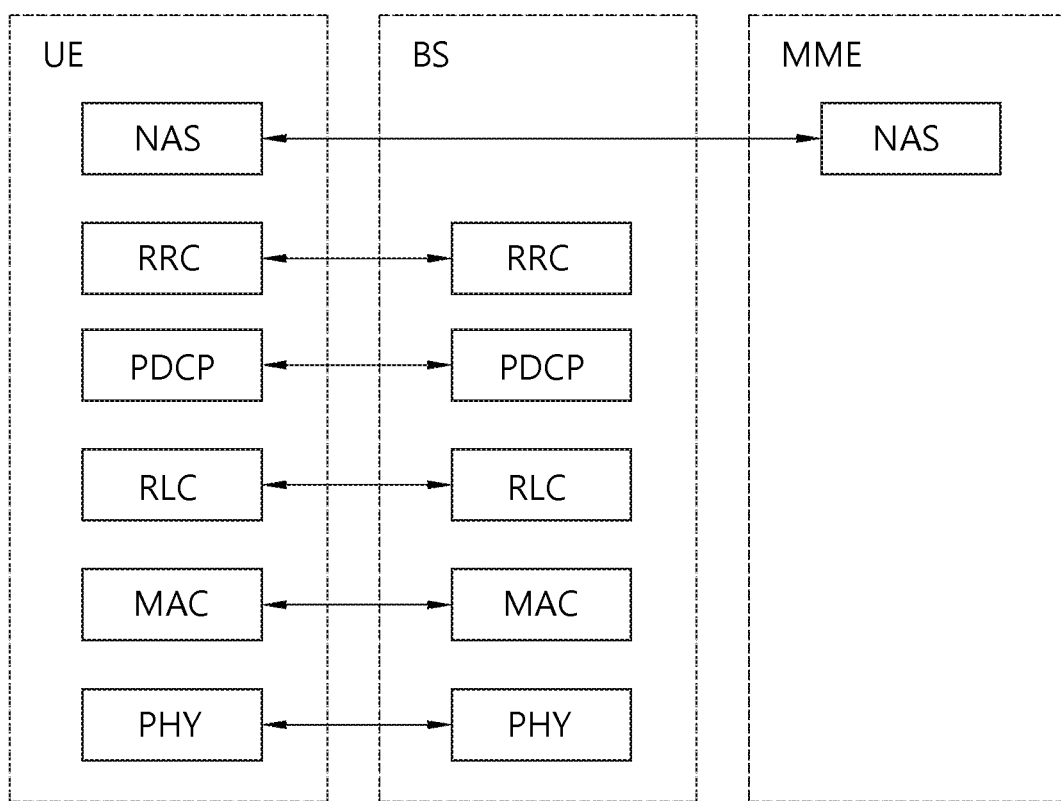
FIG. 2 shows a control plane of a radio interface protocol of an LTE system.
Figure 3:
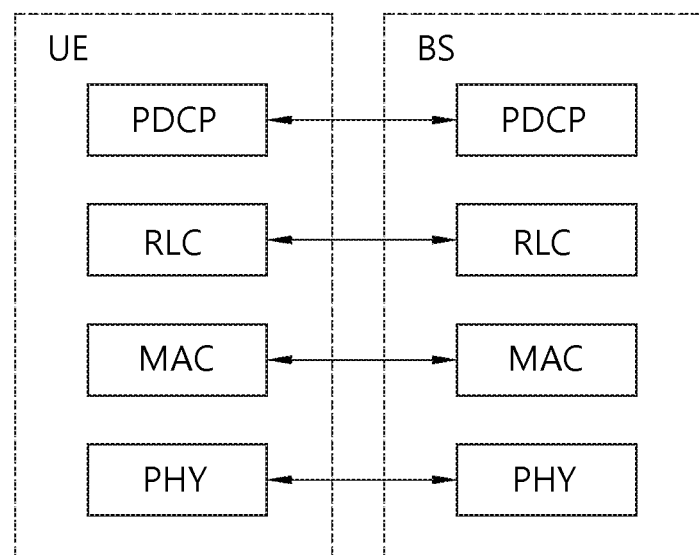
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARM). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE IDLE mobility handling, paging origination in LTE IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Figure 4:
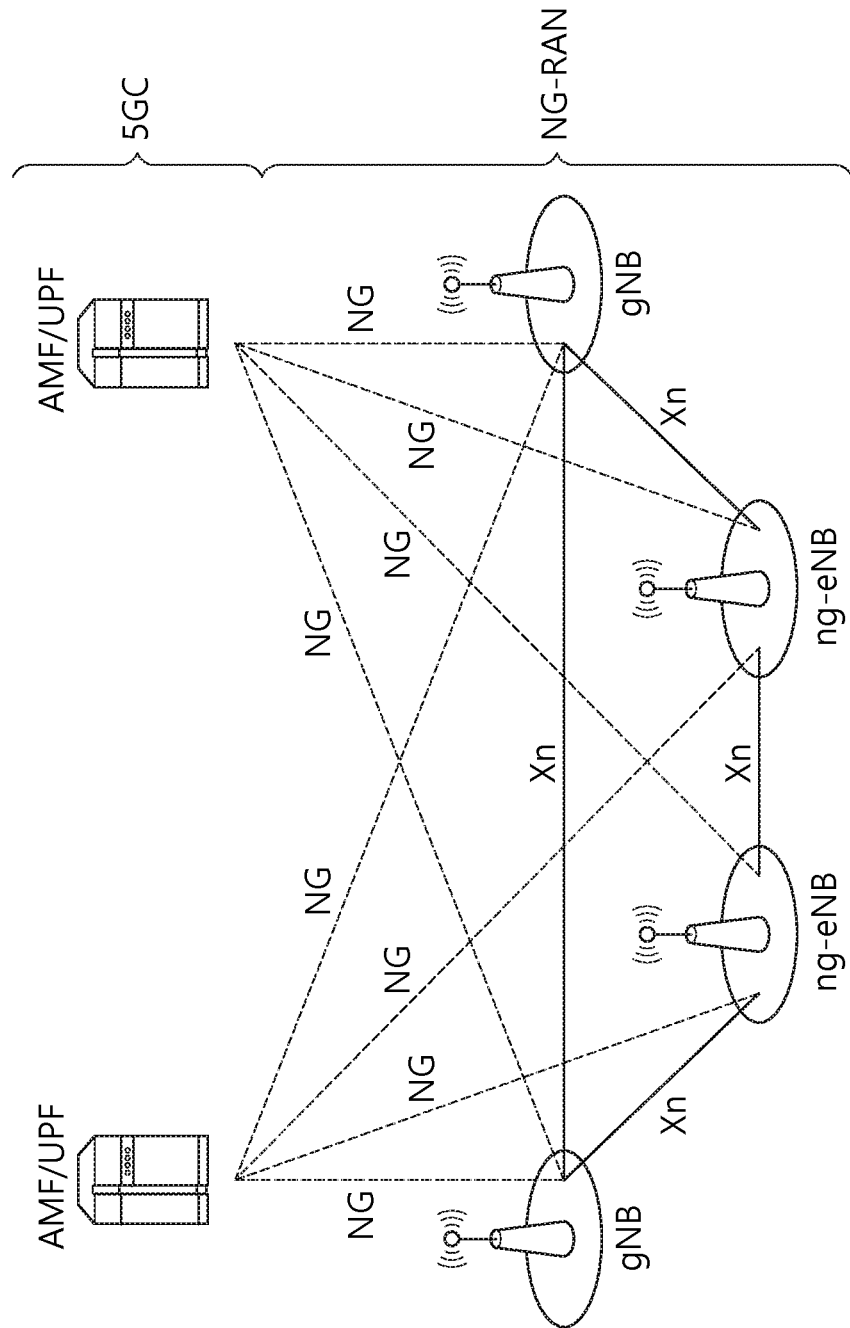
FIG. 4 shows 5G system architecture.

FIG. 4 shows 5G system architecture.

Referring to FIG. 4, a Next Generation Radio Access Network (NG-RAN) node may be either a gNB providing NR Radio Access (NR) user plane and control plane protocol terminations towards the UE or an ng-eNB providing Evolved Universal Terrestrial Radio Access (E-UTRA) user plane and control plane protocol terminations towards the UE. The gNBs and ng-eNBs may be interconnected with each other by means of the Xn interface. The gNBs and ng-eNBs may be also connected by means of the NG interfaces to the 5G Core Network (5GC), more specifically to the AMF (Access and Mobility Management Function) by means of the NG-C interface and to the UPF (User Plane Function) by means of the NG-U interface. The NG-C may be control plane interface between NG-RAN and 5GC, and the NG-U may be user plane interface between NG-RAN and 5GC.

Figure 5:
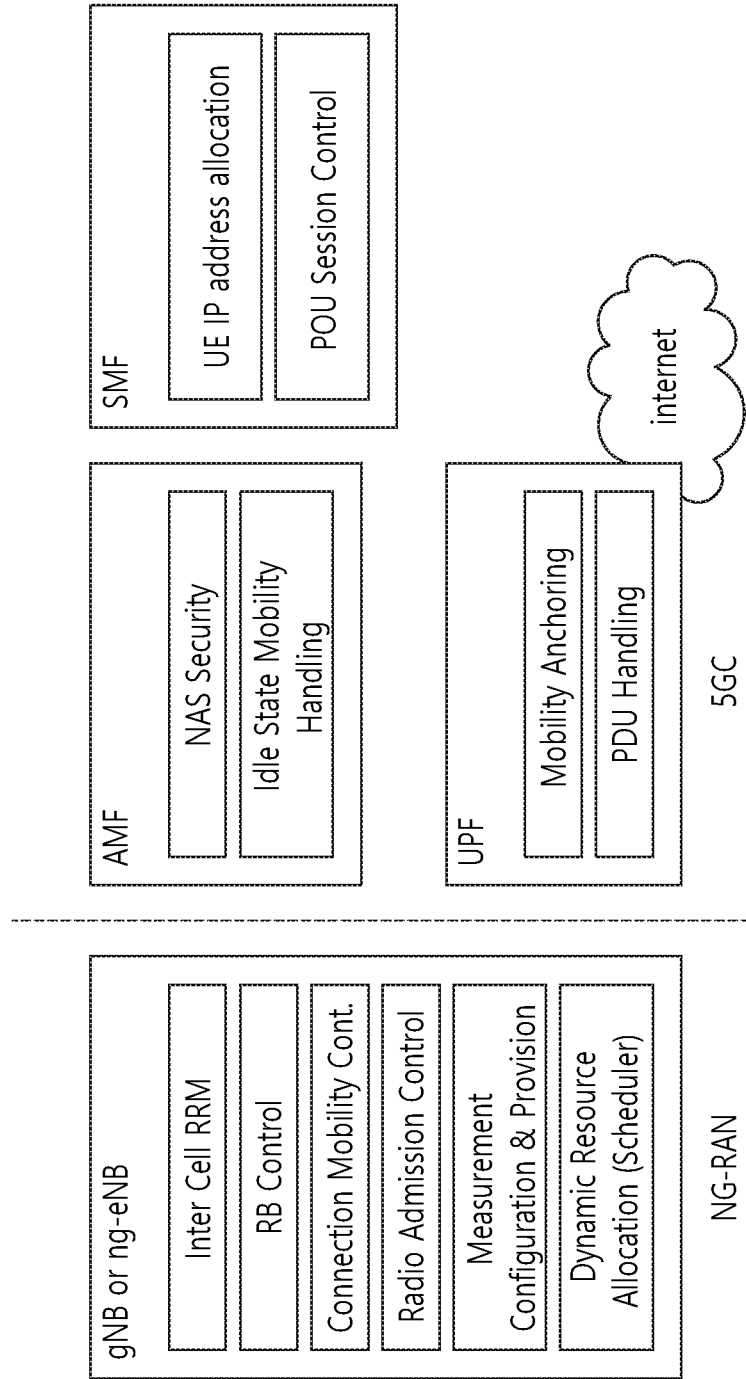
FIG. 5 shows functional split between NG-RAN and 5GC

FIG. 5 shows functional split between NG-RAN and 5GC

Referring to FIG. 5, the gNB and ng-eNB may host the following functions:

Functions for Radio Resource Management: Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or O&M);

Measurement and measurement reporting configuration for mobility and scheduling;

Transport level packet marking in the uplink;

Session Management;

Support of Network Slicing;

QoS Flow management and mapping to data radio bearers;

Support of UEs in RRC_INACTIVE state;

Distribution function for NAS messages;

Radio access network sharing;

Dual Connectivity;

Tight interworking between NR and E-UTRA.

The Access and Mobility Management Function (AMF) may host the following main functions:

NAS signalling termination;

NAS signalling security;

AS Security control;

Inter CN node signalling for mobility between 3GPP access networks;

Idle mode UE Reachability (including control and execution of paging retransmission);

Registration Area management;

Support of intra-system and inter-system mobility;

Access Authentication;

Access Authorization including check of roaming rights;

Mobility management control (subscription and policies);

Support of Network Slicing;

SMF selection.

The User Plane Function (UPF) may host the following main functions:

Anchor point for Intra-/Inter-RAT mobility (when applicable);

External PDU session point of interconnect to Data Network;

Packet routing & forwarding;

Packet inspection and User plane part of Policy rule enforcement;

Traffic usage reporting;

Uplink classifier to support routing traffic flows to a data network;

Branching point to support multi-homed PDU session;

QoS handling for user plane, e.g. packet filtering, gating, UL/DL rate enforcement;

Uplink Traffic verification (SDF to QoS flow mapping);

Downlink packet buffering and downlink data notification triggering.

The Session Management function (SMF) may host the following main functions:

Session Management;

UE IP address allocation and management;

Selection and control of UP function;

Configures traffic steering at UPF to route traffic to proper destination;

Control part of policy enforcement and QoS;

Downlink Data Notification.

Hereinafter, a protocol data unit (PDU) is described.

A MAC PDU is a bit string that is byte aligned (i.e. multiple of 8 bits) in length. MAC SDUs are bit strings that are byte aligned (i.e. multiple of 8 bits) in length. A service data unit (SDU) is included into a MAC PDU from the first bit onward.

Figure 6:
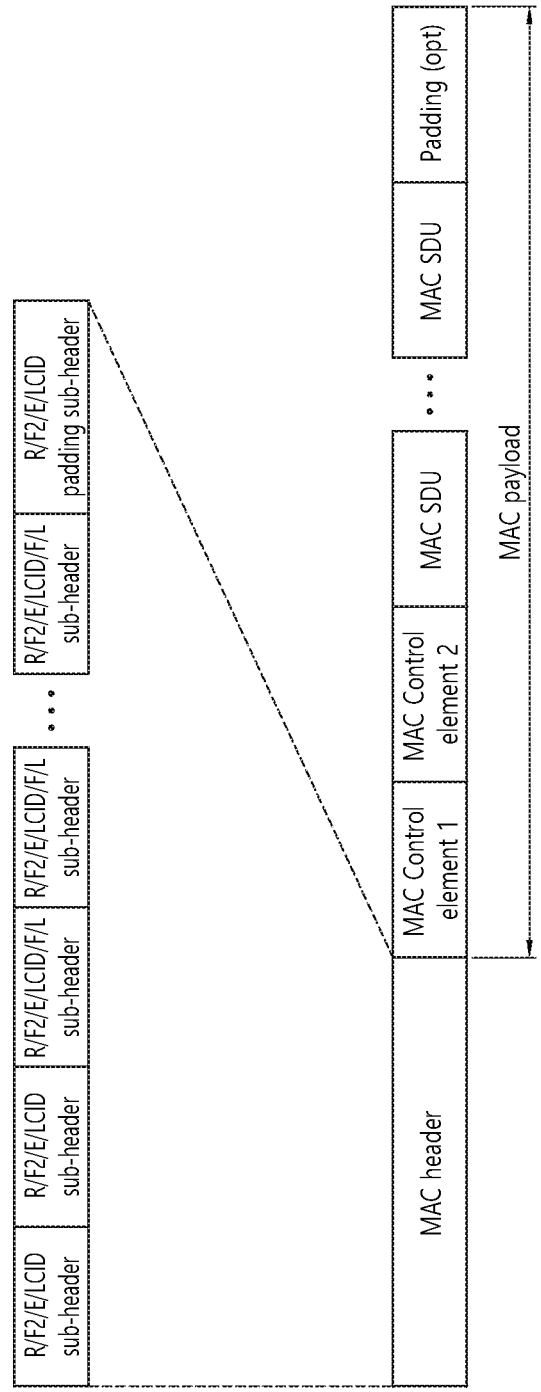
FIG. 6 shows an example of MAC PDU including MAC header, MAC control elements, MAC SDUs and padding.

FIG. 6 shows an example of MAC PDU including MAC header, MAC control elements, MAC SDUs and padding.

Referring to FIG. 6, a MAC PDU consists of a MAC header, zero or more MAC SDUs, zero or more MAC control elements, and optionally padding. Both the MAC header and the MAC SDUs are of variable sizes. Both the MAC header and the MAC SDUs are of variable sizes. A MAC PDU header consists of one or more MAC PDU subheaders. Each subheader corresponds to either a MAC SDU, a MAC control element or padding. A MAC PDU subheader consists of the five or six header fields R/F2/E/LCID/(F)/L but for the last subheader in the MAC PDU and for fixed sized MAC control elements. The last subheader in the MAC PDU and subheaders for fixed sized MAC control elements consist solely of the four header fields R/F2/E/LCID. A MAC PDU subheader corresponding to padding consists of the four header fields R/F2/E/LCID.

MAC PDU subheaders have the same order as the corresponding MAC SDUs, MAC control elements and padding. MAC control elements are always placed before any MAC SDU. Padding occurs at the end of the MAC PDU, except when single-byte or two-byte padding is required. Padding may have any value and the MAC entity shall ignore it. When padding is performed at the end of the MAC PDU, zero or more padding bytes are allowed. When single-byte or two-byte padding is required, one or two MAC PDU subheaders corresponding to padding are placed at the beginning of the MAC PDU before any other MAC PDU subheader. A maximum of one MAC PDU can be transmitted per transport block (TB) per MAC entity. A maximum of one MCH MAC PDU can be transmitted per transmission time interval (TTI).

Meanwhile, according to the prior art, a resource pool is configured only on a single carrier. Thus, an RRC layer of the UE (i.e. UE RRC) selects a resource pool on a single carrier, and then a MAC layer of the UE (i.e. UE MAC) performs resource (re-)selection on the selected resource pool. On the other hand, in case that resource pools are configured on multiple carriers, the UE may perform parallel transmissions on different carriers. If the UE performs parallel transmissions on different carriers, the UE will independently select resources on each pool/carrier. In this case, the UE may perform parallel transmissions on congested carriers, and so increase congestion on those carriers. Hereinafter, a method for a UE to transmit a MAC PDU or MAC control element (CE) on multiple carriers and an apparatus supporting the same according to an embodiment of the present invention are described in detail.

According to an embodiment of the present invention, multiple carriers or multiple pools may be configured. If multiple carriers/pools are configured by a radio resource control (RRC), the UE may select resources (i.e. resource grants) on each carrier/pool. That is, the UE may allocate resource grants on each carrier/pool. For example, the resources may be sidelink resources, and the resource grants may be sidelink grants.

Then, for transmission of each MAC PDU, for example, associated to a sidelink control information (SCI), the UE may select a carrier/pool with the earliest resource grant in time, among the carriers/pools configured by the RRC in the logical channel prioritization. If multiple carriers/pools with the earliest resource grant in time are available, the UE may select a carrier/pool with the lowest channel busy ratio (CBR) value, among multiple carriers/pools with the earliest resource grant in time in the logical channel prioritization. The UE may not select a carrier/pool which does not provides resource grant within a time offset. The time offset may start from the earliest resource grant in time, among the resource grants of the multiple carriers/pools.

Alternatively, for transmission of each MAC PDU, for example, associated to the SCI, the UE may select one or more carrier/pools with one or more resource grants within a time offset from a current subframe or a current transmission time interval (TTI), among the carriers/pools configured by the RRC. If multiple carriers/pools with resource grants within the time offset are available, the UE may select a carrier/pool with the lowest CBR value, among multiple carriers/pools with resource grants within the time offset in the logical channel prioritization. The time offset may start from the earliest resource grant in time, among the resource grants of the multiple carriers/pools.

Hereinafter, logical channel prioritization procedure is described according to an embodiment of the present invention. For convenience of explanation, the logical channel prioritization procedure for the sidelink will be described, but the present invention is not limited thereto. For instance, logical channel prioritization procedure may be applied for autonomous uplink transmission in unlicensed band, e.g., in LTE-U or LAA, according to an embodiment of the present invention.

In case that multiple carriers or multiple pools may be configured, the UE may allocate resource grants on each carrier or pool. The UE may select a carrier/pool, and then the UE may select resources (e.g. sidelink resources) and determine a resource grant (e.g. sidelink grant) on the selected carrier or the selected resource pool. In this case, the UE may performs the logical channel prioritization procedure before transmitting a SCI and a MAC PDU on the resource grant (e.g. sidelink grant).

The logical channel prioritization procedure may be applied when a new transmission is performed. Each logical channel (e.g. sidelink logical channel) may have an associated priority. The associated priority may be a ProSe priority per packet (PPPP). Multiple logical channels may have the same associated priority.

The UE may perform the following logical channel prioritization procedure. The logical channel prioritization procedure may be performed by a MAC entity of the UE. For example, the logical channel prioritization procedure may be for each SCI corresponding to a new transmission in V2X sidelink communication.

The MAC entity in the UE side may allocate resources to logical channels (e.g. sidelink logical channels) in the following steps:

Step 0: the UE may select a destination, having the sidelink logical channel with the highest priority, among the sidelink logical channels having data available for transmission. For example, the destination may be a ProSe destination.

Step 1: the UE may select a carrier/pool with the earliest sidelink grant in time among the carriers/pools, except the previously selected carrier/pool(s) if any. The carriers/pools may be configured by an RRC layer. If multiple carriers/pools with the earliest sidelink grant in time are available among the carriers/pools configured by the RRC layer, the UE may select a carrier/pool with the lowest channel busy ratio (CBR) value among the carriers/pools configured by the RRC layer.

Alternatively, the UE may select a carrier among the carriers configured by the RRC layer within a time offset, or a resource pool among the resource pools configured by the RRC layer within a time offset. If multiple carriers/pools with sidelink grants within the time offset are available, the UE may select a carrier/pool with the lowest CBR value among the multiple carriers/pools with sidelink grants within the time offset in the logical channel prioritization. The time offset may start from the earliest sidelink grant in time among the sidelink grants of the carrier/pool.

For each MAC PDU associated to the SCI for each carrier or each resource pool:
Step 2: Among the sidelink logical channels belonging to the selected destination and having data available for transmission, the UE may allocate resources to the sidelink logical channel with the highest priority;
Step 3: if any resources remain, sidelink logical channels belonging to the selected destination may be served in decreasing order of priority, until either the data for the sidelink logical channel(s) or the sidelink grant is exhausted, whichever comes first. Sidelink logical channels configured with equal priority may be served equally.
Step 4: if the data for the sidelink logical channel(s) is not exhausted, and if the sidelink grant on the selected carrier/pool is exhausted, UE proceeds to Step 0. Namely, in this case, the UE may repeat from Step 0 to Step 3. In this repetition, the UE may exclude the carrier/pool(s) which was previously selected in Step 1.

The UE may also follow the rules below during the scheduling procedures above:
The UE may not segment an RLC SDU (or partially transmitted SDU) if the whole SDU (or partially transmitted SDU) fits into the remaining resources;
If the UE segments an RLC SDU from the sidelink logical channel, it shall maximize the size of the segment to fill the grant as much as possible;
The UE may maximize the transmission of data;
If the MAC entity is given a sidelink grant size that is equal to or larger than 10 bytes (for sidelink communication) or 11 bytes (for V2X sidelink communication) while having data available for transmission, the MAC entity may not transmit only padding.
When the MAC entity is requested to transmit multiple MAC PDUs in one TTI, the above step 1, 2 & 3 and the associated rules may be applied to sidelink grant on each carrier/pool, independently. Alternatively, when the MAC entity is requested to transmit multiple MAC PDUs in one TTI, the above step 1, 2 & 3 and the associated rules may be applied to the sum of the capacities of sidelink grants of all selected carriers/pools.

Figure 7:
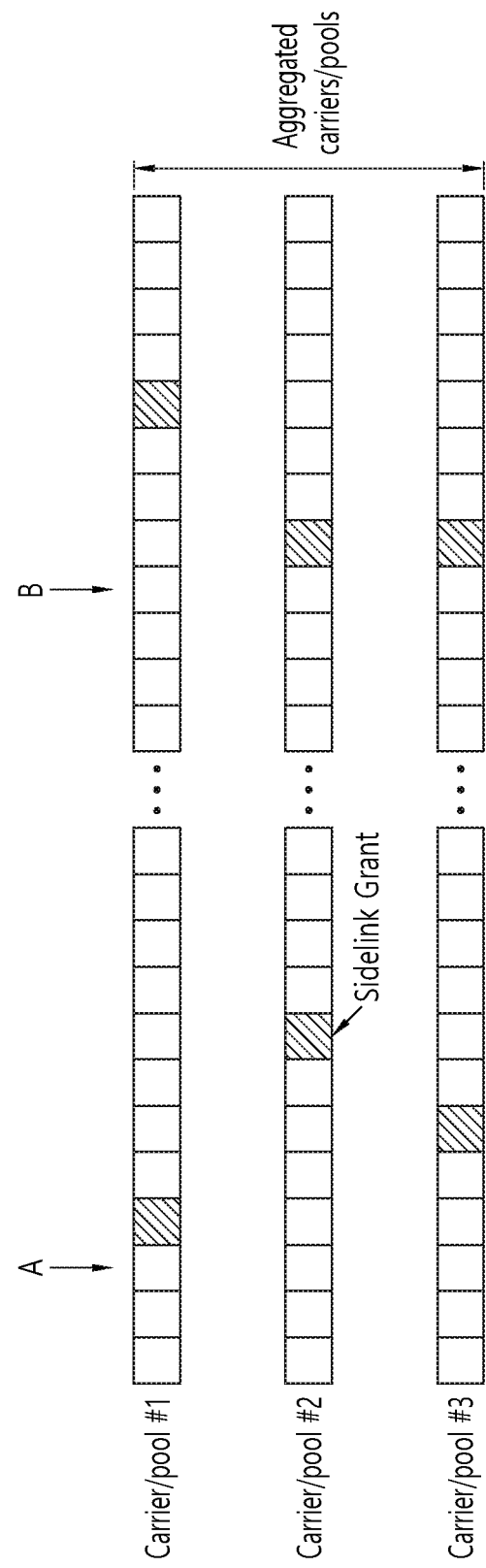
FIG. 7 shows a drawing to explain a procedure for selecting a carrier with the earliest resource grant among multiple carriers according to an embodiment of the present invention.

FIG. 7 shows a drawing to explain a procedure for selecting a carrier with the earliest resource grant among multiple carriers according to an embodiment of the present invention.

Referring to FIG. 7, the UE may be configured with three carriers or three resource pools. The three carriers or three resource pools may be configured by the RRC layer. Then, the UE may determine resource grants as in FIG. 7. The resource grants may be sidelink grants.

For example, it is assumed that a data becomes available for transmission at the point A in FIG. 7. Hereinafter, logical channel prioritization procedure in case that the data becomes available for transmission at the point A is described, according to an embodiment of the present invention.

Firstly, if the data becomes available for transmission at the point A, the UE may select a destination, having the sidelink logical channel with the highest priority, among the sidelink logical channels having data available for transmission. Then, the UE may select a carrier/pool with the earliest sidelink grant in time among the carriers/pools configured by the RRC. In FIG. 7, the UE may select carrier/pool #1 which provides the earliest sidelink grant in time. Then, the UE may perform the Step 2 and the Step 3 on the selected carrier/pool #1.

Secondly, if the data for the sidelink logical channel(s) is still not exhausted, but if the sidelink grant on the carrier/pool #1 is exhausted, the UE may select a carrier/pool with the earliest sidelink grant in time, except the carrier/pool #1, among the carriers/pools configured by the RRC layer. In FIG. 7, the UE may select carrier/pool #3 which provides the earliest sidelink grant in time, following carrier/pool #1. Then, the UE may perform Step 2 and Step 3 on the carrier/pool #3.

Thirdly, if the data for the sidelink logical channel(s) is exhausted, the UE may transmit a MAC PDU on each selected carrier/pool. However, if the data for the sidelink logical channel(s) is still not exhausted, but if the sidelink grant on the carrier/pool #3 is exhausted, the UE may select carrier/pool #2, following carrier/pool #1 and #3. Then, the UE may perform Step 2 and Step 3 on the carrier/pool #2. Finally, the UE may transmit a MAC PDU on each selected carrier/pool.

For example, it is assumed that a data becomes available for transmission at the point B in FIG. 7. Hereinafter, logical channel prioritization procedure in case that the data becomes available for transmission at the point B is described, according to an embodiment of the present invention.

Firstly, if the data becomes available for transmission at the point B, the UE may select a destination, having the sidelink logical channel with the highest priority, among the sidelink logical channels having data available for transmission. Then, the UE may select carriers/pools with the earliest sidelink grant in time among the carriers/pools configured by the RRC. In FIG. 7, the UE may initially select carrier/pool #2 and #3 because both of them provide the earliest sidelink grant in time. In this case, the UE may selects a carrier/pool which provides the lowest CBR level. Thus, if carrier/pool #3 provides a lower CBR value than carrier/pool #2, the UE may select the carrier/pool #3. Then, the UE may perform the Step 2 and the Step 3 on the selected carrier/pool #3.

Note that if a CBR value is not available, the UE may randomly select a carrier/pool among multiple carriers/pools (i.e. carrier/pool #2 and #3) providing sidelink grants at the same time. In this example, if CBR values are not available for carrier #2 and/or carrier #3, the UE may choose one of them, randomly. It is assumed that the UE selects the carrier/pool #3.

Secondly, if the data for the sidelink logical channel(s) is still not exhausted, but if the sidelink grant on the carrier/pool #3 is exhausted, the UE may select a carrier/pool with the earliest sidelink grant in time, except the carrier/pool #3, among the carriers/pools configured by the RRC layer. That is, the UE may select carrier/pool #2 which provides the earliest sidelink grant in time. Then, the UE may perform the Step 2 and the Step 3 on the selected carrier/pool #2.

Thirdly, if the data for the sidelink logical channel(s) is exhausted, the UE may transmit a MAC PDU on each selected carrier/pool. However, if the data for the sidelink logical channel(s) is still not exhausted, but if the sidelink grant on the carrier/pool #2 is exhausted, the UE may select carrier/pool #1, following carrier/pool #2 and #3. Then, the UE may perform the Step 2 and the Step 3 on the selected carrier/pool #1. Finally, the UE may transmit a MAC PDU on each selected carrier/pool.

Figure 8:
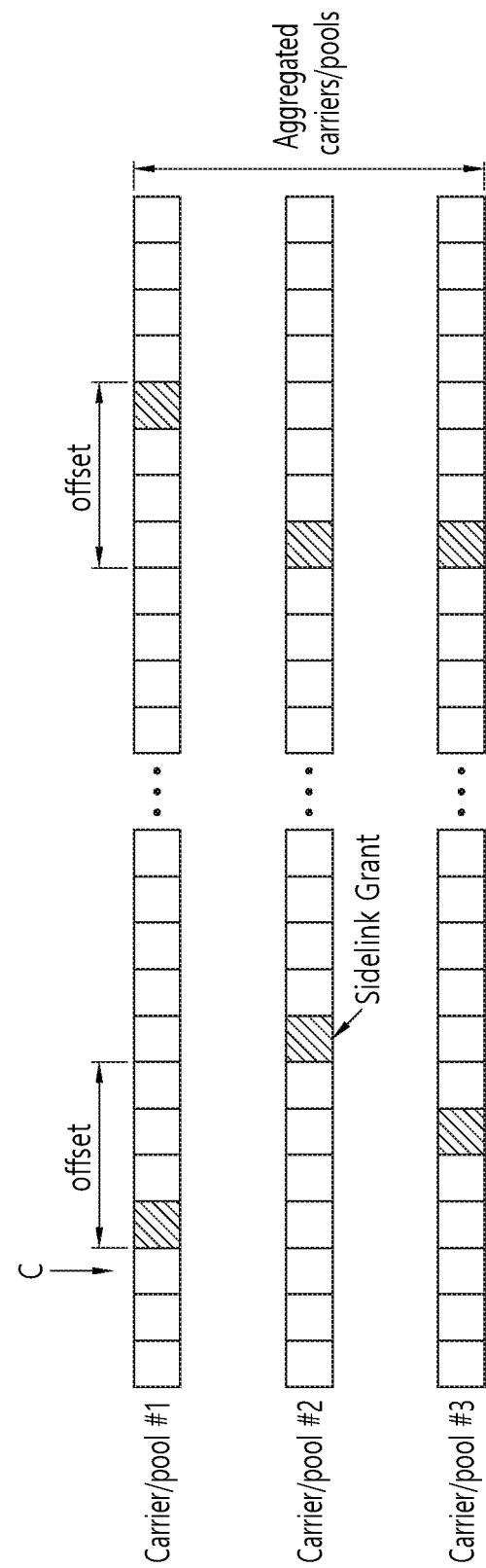
FIG. 8 shows a drawing to explain a procedure for selecting a carrier with resource grant within an offset among multiple carriers according to an embodiment of the present invention.

FIG. 8 shows a drawing to explain a procedure for selecting a carrier with resource grant within an offset among multiple carriers according to an embodiment of the present invention.

Referring to FIG. 8, the UE may be configured with three carriers or three resource pools. The three carriers or three resource pools may be configured by the RRC layer. Then, the UE may determine resource grants as in FIG. 8. The resource grants may be sidelink grants.

For example, it is assumed that a data becomes available for transmission at the point C in FIG. 8. Hereinafter, logical channel prioritization procedure in case that the data becomes available for transmission at the point C is described, according to an embodiment of the present invention.

Firstly, if the data becomes available for transmission at the point C, the UE may select a destination, having the sidelink logical channel with the highest priority, among the sidelink logical channels having data available for transmission. Then, the UE may select a carrier/pool within a time offset from the earliest sidelink grant in time among the carriers/pools configured by the RRC layer. In FIG. 8, the UE may select carrier/pool #1 and #3 which provide sidelink grants within the time offset from the earliest sidelink grant in time. In this case, the UE may select a carrier/pool which provides the lowest CBR level. If carrier/pool #1 provides a lower CBR value than carrier/pool #3, the UE may select the carrier/pool #1. Then, the UE may perform the Step 2 and the Step 3 on the selected carrier/pool #1.

Note that if a CBR value is not available, the UE may randomly select a carrier/pool among multiple carriers/pools (i.e. carrier/pool #1 and #3) providing sidelink grants at the same time. In this example, if CBR values are not available for carrier #1 and/or carrier #3, the UE may choose one of them, randomly. It is assumed that the UE selects the carrier/pool #1.

Secondly, if the data for the sidelink logical channel(s) is still not exhausted, but if the sidelink grant on the carrier/pool #1 is exhausted, the UE may select carrier/pool #3. Then, the UE may perform the Step 2 and the Step 3 on the selected carrier/pool #3. Finally, the UE may transmit a MAC PDU on each selected carrier/pool. Note that the sidelink grant on carrier/pool #2 is not used in this example because the sidelink grant on carrier/pool #2 is not within the time offset.

According to an embodiment of the present invention, if time and frequency resources are allocated on multiple carriers or multiple resource pools at the same time or within a certain time interval, and if a MAC CE should be transmitted, the UE may select a carrier of a resource pool with the lowest CBR value. Further, the UE may selects additional carrier(s) of the resource pool with the next lowest CBR value, or additional carrier(s) of another resource pool with the next lowest CBR value for transmission of the MAC CE, if necessary. If only one carrier of the resource pool is selected, the MAC CE may be included in a MAC PDU transmitted on the selected carrier or a carrier of the selected resource pool. If multiples carriers of the resource pool or multiple carriers of multiple resource pools are selected, the MAC CE may be duplicated in multiple MAC PDUs transmitted on the multiple carriers. Thus, each MAC PDU on each selected carrier may include the same MAC CE.

Figure 9:
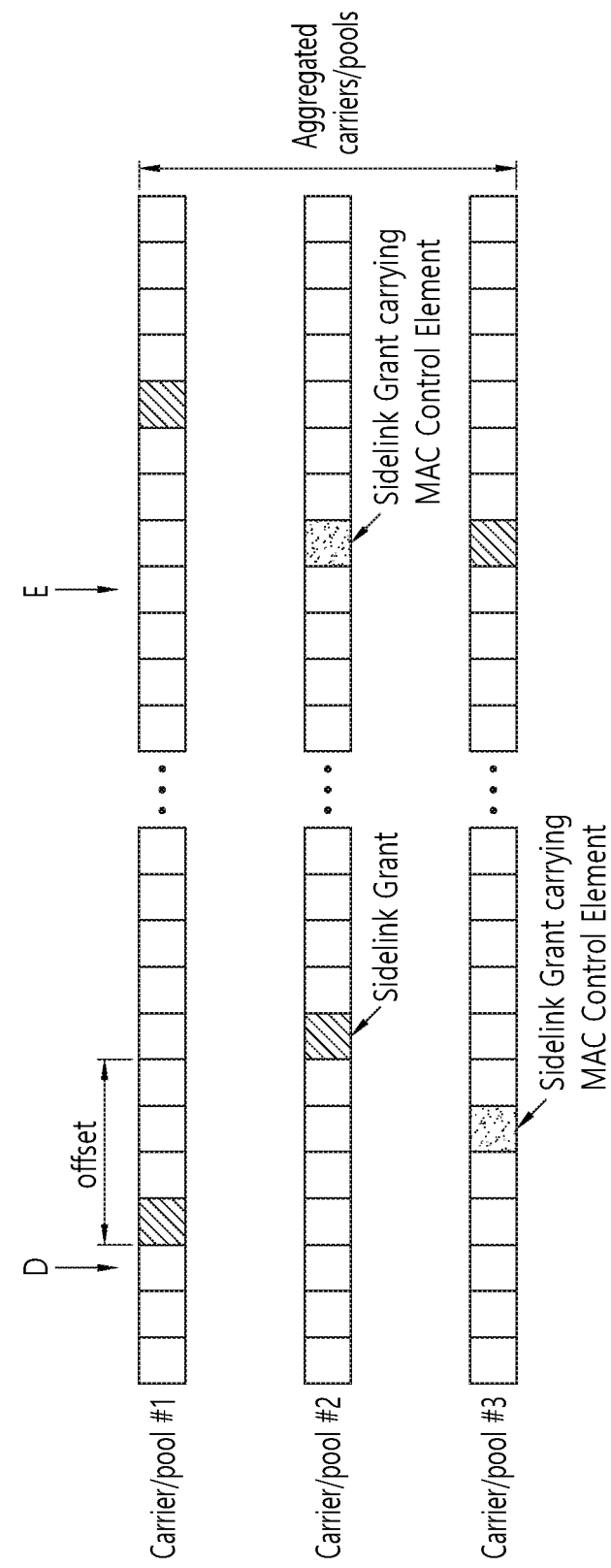
FIG. 9 shows a drawing to explain a procedure for selecting a carrier to transmit a MAC CE among multiple carriers according to an embodiment of the present invention.

FIG. 9 shows a drawing to explain a procedure for selecting a carrier to transmit a MAC CE among multiple carriers according to an embodiment of the present invention.

Referring to FIG. 9, the UE may be configured with three carriers or three resource pools. The three carriers or three resource pools may be configured by the RRC layer. Then, the UE may determine resource grants as in FIG. 9. The resource grants may be sidelink grants.

For example, it is assumed that the UE determines transmission of a MAC CE, or triggers or creates a MAC CE at the point D in FIG. 9. According to an embodiment of the present invention, an offset may be used. The offset may start from the earliest sidelink grant among the aggregated carriers/pools. For transmission of the MAC CE, the UE may determine which carrier/pool is selected to transmit the MAC CE, based on the offset and CBR of each carrier/pool. There are two candidates of carriers/pools (i.e. carrier/pool #1 and #3) which have sidelink grants within the offset. In this case, the UE may choose a carrier/pool with a lowest CBR value or a highest priority indicated by a network. For instance, if carrier/pool #3 has a lower CBR value than carrier/pool #1, the UE may choose carrier/pool #3.

Alternatively, the UE may choose one or more carrier/pools of with a CBR value below a threshold indicated by the network. Or, the UE may choose one or more carrier/pools of with a priority below or above a threshold indicated by the network. If the UE chooses multiple carriers/pools, the UE may duplicate the same MAC CE on the sidelink grants of multiple carriers/pools within the offset. Alternatively, if the UE chooses multiple carriers/pools, the UE may choose one carrier/pool with the earliest sidelink grant. If the UE receives the same MAC CE at the same subframe on different carriers, the UE may choose and apply only one of the received MAC CEs. If the UE receives the same MAC CE within the offset on different carriers, the UE may choose and apply only one of the received MAC CEs.

For example, it is assumed that the UE determines transmission of a MAC CE, or triggers or creates a MAC CE at the point E in FIG. 9. According to an embodiment of the present invention, an offset may not be used. For transmission of the MAC CE, the UE may select a carrier/pool with the earliest sidelink grant among the aggregated carriers/pools. There are two candidates of carriers/pools (i.e. carrier/pool #2 and #3) which have the earliest sidelink grants. In this case, the UE may choose a carrier/pool with a lowest CBR value or a highest priority indicated by a network. For instance, if carrier/pool #2 has a lower CBR value than carrier/pool #3, the UE may choose carrier/pool #2.

Alternatively, the UE may choose one or more carrier/pools of with a CBR value below a threshold indicated by the network. If the UE choose multiple carriers/pools, the UE may duplicate the same MAC CE on the sidelink grants of multiple carriers/pools within the offset or choose one carrier/pool with the earliest sidelink grant. If the UE receives the same MAC CE at the same subframe on different carriers or within the offset on different carriers, the UE may choose and apply only one of the received MAC CEs.

According to an embodiment of the present invention, if time and frequency resources are allocated on multiple carriers of multiple activated SPS configurations at the same time, and if a MAC CE should be transmitted, the UE may select a carrier of an activated SPS configuration with the lowest CBR value. Alternatively, if time and frequency resources are allocated on multiple carriers of multiple activated SPS configurations within a certain time interval, and if a MAC CE should be transmitted, the UE may select a carrier of an activated SPS configuration with the lowest CBR value. Further, the UE may select additional carrier(s) of the activated SPS configuration with the next lowest CBR value, or additional carrier(s) of another activated SPS configuration with the next lowest CBR value for transmission of the MAC CE, if necessary. If only one carrier of an activated SPS configuration is selected, the MAC CE may be included in a MAC PDU transmitted on the selected carrier or a carrier of the selected activated SPS configuration. If multiples carriers of the activated SPS configuration or multiple carriers of multiple activated SPS configurations are selected, the MAC CE may be duplicated in multiple MAC PDUs transmitted on the multiple carriers. Thus, each MAC PDU on each selected carrier may include the same MAC CE.

Figure 10:
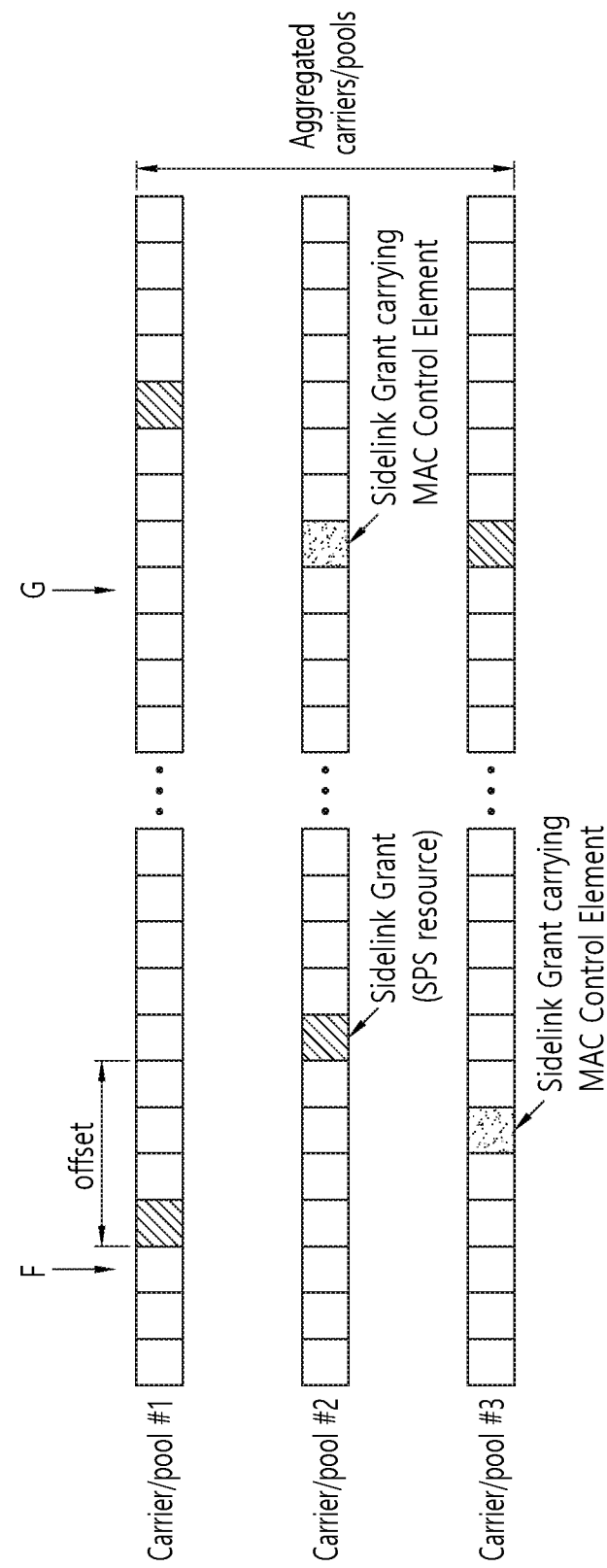
FIG. 10 shows a drawing to explain a procedure for selecting a carrier to transmit a MAC CE among multiple carriers according to an embodiment of the present invention.

FIG. 10 shows a drawing to explain a procedure for selecting a carrier to transmit a MAC CE among multiple carriers according to an embodiment of the present invention.

Referring to FIG. 10, the UE may be configured with three carriers or three resource pools. The three carriers or three resource pools may be configured by the RRC layer. Then, the UE may determine resource grants as in FIG. 10. The resource grants may be sidelink grants.

For example, it is assumed that the UE determines transmission of a MAC CE, or triggers or creates a MAC CE at the point F in FIG. 10. According to an embodiment of the present invention, an offset may be used. The offset may start from the earliest sidelink grant among the aggregated carriers. For transmission of the MAC CE, the UE may determine which carrier/configuration is selected to transmit the MAC CE, based on the offset and CBR of each carrier/configuration. There are two candidates of carriers/configuration (i.e. carriers/SPS configuration #1 and #3) which have sidelink grants within the offset. In this case, the UE may choose a carrier/configuration with a lowest CBR value or a highest priority indicated by a network. For instance, if carrier/configuration #3 has a higher priority than carrier/pool #1, the UE may choose carrier/pool #3. For instance, if carrier/configuration #3 has a lower CBR value than carrier/pool #1, the UE may choose carrier/pool #3.

Alternatively, the UE may choose one or more carrier/configurations of with a priority below or above a threshold indicated by the network. Or, the UE may choose one or more carrier/configurations of with a CBR value below a threshold indicated by the network. If the UE chooses multiple carriers/configurations, the UE may duplicate the same MAC CE on the sidelink grants of multiple carriers/configurations within the offset. If the UE chooses multiple carriers/configurations, the UE may choose one carriers/configuration with the earliest sidelink grant. If UE receives the same MAC CEs at the same subframe on different carriers or within the offset on different carriers, the UE may choose and apply only one of the received MAC CEs.

For example, it is assumed that the UE determines transmission of a MAC CE, or triggers or creates a MAC CE at the point G in FIG. 10. According to an embodiment of the present invention, an offset may not be used. For transmission of the MAC CE, the UE may select a carriers/configuration with the earliest sidelink grant among the aggregated carriers. There are two candidates of carriers/configurations (i.e. carriers/SPS configuration #2 and #3) which have the earliest sidelink grants. In this case, the UE may choose a carriers/configuration with a lowest CBR value or a highest priority indicated by the network. For instance, if carriers/configuration #2 has a higher priority than carrier/pool #3, the UE may choose carrier/pool #2. For instance, if carriers/configuration #2 has a lower CBR value than carrier/pool #3, the UE may choose carrier/pool #2.

Alternatively, the UE may choose one or more carriers/configurations of with a priority is below or above a threshold indicated by the network. Alternatively, the UE may choose one or more carriers/configurations of with a CBR value below a threshold indicated by the network. If UE chooses multiple carriers/configurations, the UE may duplicate the same MAC CE on the sidelink grants of multiple carriers/pools within the offset, or choose one carriers/configuration with the earliest sidelink grant. If the UE receives the same MAC CEs at the same subframe on different carriers or within the offset on different carriers, the UE may choose and apply only one of the received MAC CEs.

According to an embodiment of the present invention, the MAC CE may be transmitted either in uplink or in sidelink. The sidelink transmission on one carrier may indicate whether a MAC CE is transmitted in sidelink on another carrier. For example, in FIG. 9 or 10, if carrier #3 transmits a MAC CE, sidelink transmission on carrier #1 and/or carrier #2 may indicate that a MAC CE is transmitted in sidelink on carrier #3. This indication indicating the MAC CE on carrier #3 may be carried in at least one of sidelink control information (SCI), another MAC CE, a MAC header, a MAC payload, or a RRC message which are transmitted on carrier #1 and/or #2.

Figure 11:
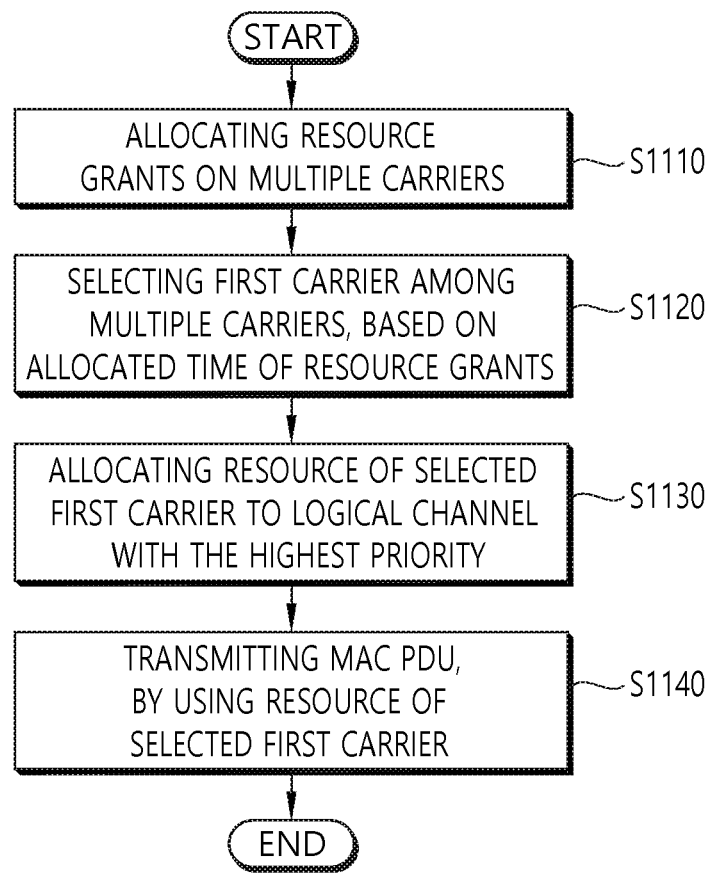
FIG. 11 is a block diagram illustrating a method for a UE to transmit a MAC PDU according to an embodiment of the present invention.

FIG. 11 is a block diagram illustrating a method for a UE to transmit a MAC PDU according to an embodiment of the present invention.

Referring to FIG. 11, in step S1110, the UE may allocate resource grants on multiple carriers. The resource grants may be allocated on the multiple carriers, by the UE, autonomously. The resource grants may be allocated on the multiple carriers, by the UE, based on a configuration received from a base station.

In step S1120, the UE may select a first carrier among the multiple carriers, based on allocated time of the resource grants.

The first carrier may be a carrier which has the earliest resource grant among the multiple carriers. If there are a plurality of carriers having the earliest resource grant, the first carrier may be a carrier which has the lowest channel busy ratio (CBR) value among the plurality of carriers.

The first carrier may be a carrier which has a resource grant within a time offset among the multiple carriers. If there are a plurality of carriers having the resource grant within the time offset, the first carrier may be a carrier which has the lowest channel busy ratio (CBR) value among the plurality of carriers. The time offset may start from a time of the earliest resource grant among the multiple carriers.

In step S1130, the UE may allocate a resource of the selected first carrier to a logical channel with the highest priority.

Furthermore, the UE may construct the MAC PDU, based on a data of the logical channel with the highest priority.

In step S1140, the UE may transmit the MAC PDU, by using the resource of the selected first carrier.

Furthermore, the UE may select a second carrier among the multiple carriers, based on allocated time of the resource grants, if a data for the logical channel remains and a resource grant on the selected first carrier is exhausted. The second carrier may be a carrier which has the second earliest resource grant among the multiple carriers. The second carrier may be a carrier which has a resource grant within a time offset among the multiple carriers.

Furthermore, the UE may select a destination, having the logical channel with the highest priority, among logical channels having data available for transmission. The resource of the selected first carrier may be allocated to the logical channel with the highest priority, among the logical channels belonging to the selected destination and having data available for transmission.

According to an embodiment of the present invention, in case that resource pools are configured on multiple carriers, the UE selects certain carrier/resource pool based on allocated time of the resource grants. Further, the UE consider a CBR value or priority for selecting certain carrier/resource pool among the multiple carriers. Thus, in case that the UE perform parallel sidelink/uplink transmissions, congested carriers is not used for sidelink/uplink transmissions.

Figure 12:
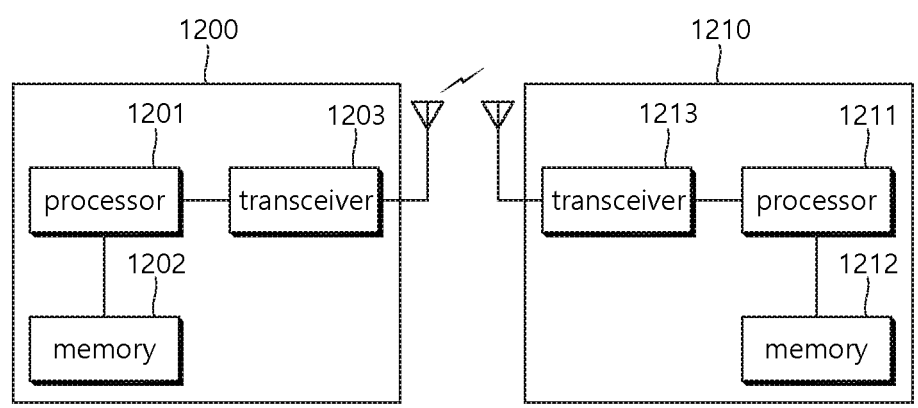
FIG. 12 is a block diagram illustrating a wireless communication system according to the embodiment of the present invention.

FIG. 12 is a block diagram illustrating a wireless communication system according to the embodiment of the present invention.

A BS 1200 includes a processor 1201, a memory 1202 and a transceiver 1203. The memory 1202 is connected to the processor 1201, and stores various information for driving the processor 1201. The transceiver 1203 is connected to the processor 1201, and transmits and/or receives radio signals. The processor 1201 implements proposed functions, processes and/or methods. In the above embodiment, an operation of the base station may be implemented by the processor 1201.

A UE 1210 includes a processor 1211, a memory 1212 and a transceiver 1213. The memory 1212 is connected to the processor 1211, and stores various information for driving the processor 1211. The transceiver 1213 is connected to the processor 1211, and transmits and/or receives radio signals. The processor 1211 implements proposed functions, processes and/or methods. In the above embodiment, an operation of the base station may be implemented by the processor 1211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for transmitting, by a user equipment (UE), a medium access control protocol data unit (MAC PDU) in a wireless communication system, the method comprising:
    allocating resource grants on multiple carriers;
    selecting a first carrier among the multiple carriers, based on allocation times of the resource grants;
    allocating a resource of the selected first carrier to a logical channel with the highest priority;
    selecting a second carrier among the multiple carriers, based on the allocation times of the resource grants, based on remaining data for the logical channel and a resource grant on the selected first carrier being exhausted; and
    transmitting the MAC PDU, based on the resource of the selected first carrier.

2. The method of claim 1, wherein the first carrier is a carrier which has the earliest resource grant among the multiple carriers.

3. The method of claim 2, wherein, based on a plurality of carriers having the earliest resource grant, the first carrier is a carrier which has the lowest channel busy ratio (CBR) value among the plurality of carriers.

4. The method of claim 1, wherein the first carrier is a carrier which has a resource grant within a time offset among the multiple carriers.

5. The method of claim 4, wherein, based on a plurality of carriers having the resource grant within the time offset, the first carrier is a carrier which has the lowest channel busy ratio (CBR) value among the plurality of carriers.

6. The method of claim 4, wherein the time offset starts from a time of the earliest resource grant among the multiple carriers.

7. The method of claim 1, further comprising:
    constructing the MAC PDU, based on a data of the logical channel with the highest priority.

8. The method of claim 1, further comprising:
    selecting a destination, having the logical channel with the highest priority, among logical channels having data available for transmission.

9. The method of claim 8, wherein the resource of the selected first carrier is allocated to the logical channel with the highest priority, among the logical channels belonging to the selected destination and having data available for transmission.

10. The method of claim 1, wherein the second carrier is a carrier which has the second earliest resource grant among the multiple carriers.

11. The method of claim 1, wherein the second carrier is a carrier which has a resource grant within a time offset among the multiple carriers.

12. The method of claim 1, the resource grants are allocated on the multiple carriers, by the UE, autonomously.

13. The method of claim 1, the resource grants are allocated on the multiple carriers, by the UE, based on a configuration received from a base station.

14. The method of claim 1, wherein the UE communicates with at least one of a mobile terminal, a network or autonomous vehicles other than the UE.

15. A user equipment (UE) configured to transmit a medium access control protocol data unit (MAC PDU) in a wireless communication, the UE comprising:
    at least one transceiver;
    at least one processor; and at least one memory storing instructions that, based on being executed by the at least one processor, control the UE to perform operations comprising:

allocating resource grants on multiple carriers;

selecting a first carrier among the multiple carriers, based on allocation times of the resource grants;

allocating a resource of the selected first carrier to a logical channel with the highest priority;

selecting a second carrier among the multiple carriers, based on the allocation times of the resource grants, based on remaining data for the logical channel and a resource grant on the selected first carrier being exhausted; and transmitting, via the transceiver, the MAC PDU, based on the resource of the selected first carrier.

* * * * *